(12) United States Patent
Lee et al.

(10) Patent No.: US 8,525,803 B2
(45) Date of Patent: Sep. 3, 2013

(54) METHOD OF GENERATING KEY CODE IN COORDINATE RECOGNITION DEVICE AND VIDEO DEVICE CONTROLLER USING THE SAME

(75) Inventors: Jae Kyung Lee, Gumi-si (KR); Ji Min Heo, Gumi-si (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 12/442,837

(22) PCT Filed: Apr. 18, 2007

(86) PCT No.: PCT/KR2007/001888
§ 371 (c)(1),
(2), (4) Date: Mar. 25, 2009

(87) PCT Pub. No.: WO2008/038875
PCT Pub. Date: Apr. 3, 2008

(65) Prior Publication Data
US 2010/0090968 A1 Apr. 15, 2010

(30) Foreign Application Priority Data
Sep. 29, 2006 (KR) .......................... 10-2006-0095726

(51) Int. Cl.
*G06F 3/041* (2006.01)
(52) U.S. Cl.
USPC .......................................... 345/173; 345/902
(58) Field of Classification Search
USPC ........................................................ 345/173
See application file for complete search history.

(56) References Cited

U.S. PATENT DOCUMENTS

| 5,367,316 A | 11/1994 | Ikezaki | 345/158 |
| 5,648,781 A | 7/1997 | Choi | 341/176 |

(Continued)

FOREIGN PATENT DOCUMENTS

| CN | 1178442 A | 4/1998 |
| CN | 1252551 A | 5/2000 |

(Continued)

OTHER PUBLICATIONS

International Search Report dated Aug. 2, 2007.

(Continued)

*Primary Examiner* — Alexander Eisen
*Assistant Examiner* — Robin Mishler
(74) *Attorney, Agent, or Firm* — KED & Associates, LLP

(57) ABSTRACT

A controller (101) and method for generating a key code enable key code generation by a single instance of manipulation of the controller (101) by a user, obviating repetitive keypad manipulation and thereby facilitating controller operation. A plurality of direction keys for determining a shifting direction of an object within an OSD image are provided beneath a surface of a touch pad (110) and are arranged to perform corresponding functions of the touch pad (110). The controller (101) includes a touch pad (110) having a predetermined touch pattern; a coordinate recognition unit (120) for recognizing coordinate values corresponding to a touch trajectory executed with respect to the touch pad (110); a key signal input unit (130), having a plurality of key input buttons, for generating a key signal according to a user selection of at least one of the key input buttons, the plurality of key input buttons disposed beneath the touch pad (110) and arranged according to the predetermined pattern; a system controller (140) for calculating values of at least one of a direction, speed, and distance of the touch trajectory using the recognized coordinate values and for outputting a command signal based on the calculated values and the key signal; and a key code generator (150) for generating a key code corresponding to the command signal.

6 Claims, 14 Drawing Sheets

(56) References Cited

U.S. PATENT DOCUMENTS

| | | |
|---|---|---|
| 6,292,179 B1 | 9/2001 | Lee |
| 6,396,523 B1 | 5/2002 | Segal et al. |
| 7,812,824 B2 * | 10/2010 | Im et al. .................. 345/173 |
| 2004/0041723 A1 | 3/2004 | Shibamiya et al. |
| 2004/0135774 A1 | 7/2004 | La Monica |
| 2005/0110768 A1 | 5/2005 | Marriott et al. |
| 2005/0184968 A1* | 8/2005 | Uchida et al. .................. 345/173 |
| 2005/0223339 A1* | 10/2005 | Lee .............................. 715/825 |
| 2006/0001772 A1* | 1/2006 | Hsieh .......................... 348/569 |

FOREIGN PATENT DOCUMENTS

| | | |
|---|---|---|
| EP | 1 383 034 A1 | 1/2004 |
| JP | 2006-222504 | 8/2006 |
| KR | 10-2003-0065211 | 8/2003 |
| KR | 10-2007-0034192 | 3/2007 |
| WO | WO 02/095524 A2 | 11/2002 |
| WO | WO 2006/023259 A2 | 3/2006 |

OTHER PUBLICATIONS

European Search Report dated Dec. 6, 2011.

European Search Report dated May 23, 2013 for Application 07 746 051.7.

Korean Notice of Allowance dated Feb. 7, 2013 for Application 10-2006-0095726 and English Translation.

* cited by examiner

METHOD OF GENERATING KEY CODE IN COORDINATE RECOGNITION DEVICE AND VIDEO DEVICE CONTROLLER USING THE SAME

TECHNICAL FIELD

The present invention relates to a controller and more particularly to a method of generating a key code in a coordinate recognition device and a controller using the same.

BACKGROUND ART

The controller of, for example, a video device such as a television receiver including a display device, may be provided with a keypad including a plurality of keys for channel selection, volume adjustment, etc. Such a keypad may be provided to a remote controller for controlling a wide variety of standard television functions.

To execute a specific function, a user of the video device presses (activates) a specific function key on the controller, or remote controller, which transmits to the television receiver a coded signal corresponding to the activated function. Accordingly, such a controller may be provided with numerous keys, including frequently used and infrequently used keys. Since a great number of keys tends to encumber the user, who may have difficulty in correctly searching and identifying the desired key, the video device is typically provided with a virtual keypad using an on-screen display (OSD) function. In doing so, an OSD keypad may include keys, as icons, that can therefore be excluded from the controller's keypad, i.e., a physical keypad.

The keys of the OSD keypad thus enable execution of any number of functions as desired. In essence, the corresponding keys of the virtual keypad operate in the same manner as those of the physical keypad, which are typically provided as tactile switches. As such, one pressing of any of the physical keys, as a single instance of the corresponding tactile switch operation, results in the generation of one key code to operate (manipulate) the OSD keypad.

Therefore, to move an OSD object or icon highlight (display curser) on the OSD keypad, for example, to effect a channel changing or volume control function or to navigate an OSD menu of a video device, a user must sequentially perform a series of pressing operations of the corresponding key of the physical keypad to step through a range of movement, typically using an arrow key (e.g., an up/down or left/right key) of the remote controller, so that the object or highlight is moved from an initial display location to a desired display location. This repetitious operation of the keypad is cumbersome to the user.

DISCLOSURE OF INVENTION

Accordingly, the present invention is directed to a method of generating a key code in a coordinate recognition device and a controller using the same that substantially obviate one or more of the problems due to limitations and disadvantages of the related art.

An object of the present invention is to provide a method of generating a key code in a coordinate recognition device and a controller using the same, which provides a hybrid configuration of touch pad and key input buttons for a dual-type (parallel) control of a device under controller, e.g., a video device such as a television receiver having an OSD function, enabling a selective use of the touch pad or the key input buttons to control functions (e.g., channel or volume adjustment) and particularly enabling the shifting of an object in a specific direction within an OSD image of the video device.

Another object of the present invention is to provide a method of generating a key code in a coordinate recognition device and a controller using the same, by which key codes for shifting an object displayed on an OSD menu can be selectively generated by a user performing a preferred or familiar method.

Another object of the present invention is to provide a method of generating a key code in a coordinate recognition device and a controller using the same, by which key codes for conveniently and accurately shifting an object displayed on an OSD menu to a specific position among OSD menu items can be generated without repetitive keypad manipulation by a user.

Another object of the present invention is to provide a method of generating a key code in a coordinate recognition device and a controller using the same, by which a specific key code of a range of key codes corresponding to a range of function control can be selectively generated by a single instance of manipulation of the controller by a user.

Another object of the present invention is to provide a method of generating a key code in a coordinate recognition device and a controller using the same, which provides a compact controller by enabling the control of numerous functions while minimizing a surface area of the controller.

Another object of the present invention is to provide a method of generating a key code in a coordinate recognition device and a controller using the same, which enables output of an intended (correct) key code, using finger position information, even if a key input button of a hybrid touch pad is inadvertently (incorrectly) pressed.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, there is provided a controller comprising a touch pad having a predetermined touch pattern; a coordinate recognition unit for recognizing coordinate values corresponding to a touch trajectory executed with respect to the touch pad; a key signal input unit, having a plurality of key input buttons, for generating a key signal according to a user selection of at least one of the key input buttons, the plurality of key input buttons disposed beneath the touch pad and arranged according to the predetermined pattern; a system controller for calculating values of at least one of a direction, speed, and distance of the touch trajectory using the recognized coordinate values and for outputting a command signal based on the calculated values and the key signal; and a key code generator for generating a key code corresponding to the command signal.

According to another aspect of the present invention, there is provided a method of generating a key code in a controller having a touch pad of a predetermined touch pattern and a plurality of key input buttons disposed beneath the touch pad and arranged according to the predetermined pattern. The method comprises generating a first command signal in response to a touch trajectory executed with respect to the touch pad, the first command signal being generated by recognizing coordinate values corresponding to the touch trajectory and by calculating at least one value of a direction, speed, and distance of the touch trajectory using the recognized coordinate values; generating, in response to a user selection of at least one of the key input buttons, a second command signal according to the user selection; and outputting a key code corresponding to one of the first and second command signals. The first command signal corresponds to the calculated values, and the second command signal corresponds to the selected key input button.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

BEST MODE FOR CARRYING OUT THE INVENTION

According to the present invention, a touch pad having a touch pattern of a predetermined shape is introduced to a coordinate recognition device as input means to a controller. In addition, a plurality of key input buttons for determining a shifting direction of an object within an OSD image are provided beneath a surface of the touch pad and may be integrally formed with the touch pad as one unified body. The plurality of key input buttons may include direction keys and function keys and may be arranged to perform corresponding functions of the touch pad. The predetermined shape of the touch pattern enables a full control of any one of several functions of the video device, including channel changing, volume control, and menu navigation, which are conventionally performed by a series of controller manipulations or by repetitive instances of button pressing operations.

Throughout the following specification, a touch trajectory is a manually input command executed by a user of the controller to generate a prescribed movement command signal and is thus generated by the user manually or physically touching the touch pad and following a dragging motion (track) across the surface of the touch pad. As such, a touch trajectory has properties of directionality and travel distance in consideration of the touch trajectory's termini (i.e., start point and corresponding end point) expressed in terms of x-y coordinate values and may have properties of travel speed. Also, a recognized touch trajectory according to the present invention may have a width consistent with a human finger in contact with the touch pad. Meanwhile, the touch pad of the present invention is typically operated by a user's finger, but the present invention is applicable to touch pads for use with other types of solid objects, whether opaque or transparent, conductive or non-conductive.

Figure 1:
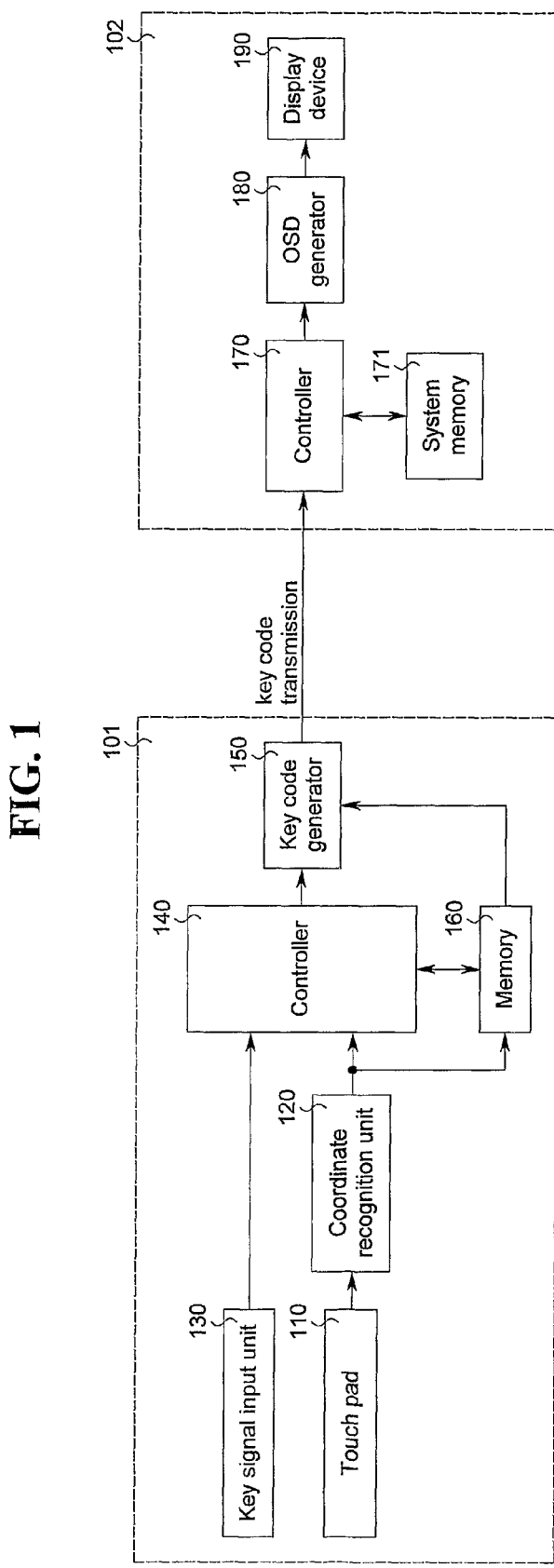
FIG. 1 is a block diagram of a controller according to the present invention, in which a device under control is also shown.

Referring to FIG. 1, a controller 101 according to the present invention generates a key code for transmission to a video device 102 (i.e., a device under control) controlled by the controller. The controller 101 includes a touch pad 110 having a predetermined touch pattern; a coordinate recognition unit 120 for recognizing coordinate values corresponding to a touch trajectory applied by a user as an input to the touch pad and for outputting a set of coordinate values, including start and end coordinates, corresponding to the touch trajectory; a key signal input unit 130, having a plurality of keys, for generating a key signal input according to a user selection of one or more of the keys; a first system controller 140 for outputting a movement command signal for moving a cursor, highlight, or other object in correspondence to a direction, speed, and distance of the touch trajectory; a key code generator 150 for generating a specific key code based on the movement command signal supplied from the first system controller; and a memory 160 for storing a system program of the first system controller and a full set of coordinate values corresponding to surface points of the predetermined touch pattern. The movement command signal of the first system controller 140 may be variously generated, in accordance with the system program stored in the memory 160, based on one of the first, second, and third embodiments of the present invention.

That is, according to the stored system program, the first system controller 140 calculates the direction, distance, and speed of a touch trajectory based on the coordinate values received from the coordinate recognition unit 120, according to a key signal input that may be concurrently or correlatively received from the key signal input unit 130, to output a movement command signal corresponding to the calculated direction, speed, and distance of the touch trajectory. In outputting the movement command signal, the first system controller 140 controls the key code generator 150 to generate a unique key code indicative of the movement command signal. At the same time, the first system controller 140 determines, based on an intrinsic touch type, whether a touch trajectory corresponds to an up/down (vertical) motion, a right/left (horizontal) motion, or a circular/elliptical motion.

The stored information of the memory 160 may be set by the manufacturer prior to sale of the controller of a video device, e.g., a television remote controller, including a coordinate recognition device. That is, an apparatus for generating a key code according to the present invention may be embodied in a remote controller, using a coordinate recognition device including a touch pad and coordinate recognition unit according to the present invention.

Accordingly, the key code output from the key code generator 150 may be transmitted to the video device 102 using an infrared transmitter circuit (not shown) provided in the controller 101 and a corresponding infrared receiver circuit (not shown) provided in the video device. That is, the key code transmission may be achieved through wireless means. Therefore, the controller 101 may as a remote controller include a wireless signal generator (not shown) for generating a wireless (e.g., infrared) signal corresponding to the key code and a wireless signal transmitter (not shown) for transmitting the wireless signal to a video device such as a television receiver. On the other hand, the key code transmission may be achieved through a hard line, for example, in cases where the key code generation is performed by a control unit integrated with a display device unit. In any event, a key code transmission is sent from the controller 101 to the video device 102.

According to the present invention, the keys of the key signal input unit 130 may include a plurality of tactile switches or key input buttons, which are preferably disposed beneath a surface of the touch pad 110 and arranged according to the predetermined pattern of the touch pad. Thus, the key signal input provided to the first system controller 140 of the controller 101 is generated according to a user selection of at least one of the key input buttons. The predetermined pattern of the touch pad may be divided into a plurality of focus areas, wherein each focus area corresponds to one of the plurality of key input buttons to control a separate function of a device under control, i.e., the video device 102. The key input buttons may also include a further tactile switch or selection key, which is also preferably disposed beneath the touch pad and may be arranged in a hollow of the predetermined pattern or in an open central area of the touch pad 110. Such a selection key may be configured to select one of an active operation of the touch pad 110 and an active operation of the plurality of key input buttons, or as a confirmation key may be configured such that, if one of a plurality of displayed OSD items is selected using the touch pad, operation of the selection key confirms a function corresponding to the selected OSD item. Meanwhile, providing the touch pad 110 with key input buttons assigned to functions other than those of the touch pad can further contribute to the compactness of the controller 101 according to the present invention.

The video device 102 includes a second system controller 170 for outputting a control signal in correspondence to the received key code transmission (e.g., an infrared signal), a system memory 171 in which coordinate values corresponding to surface points of the predetermined touch pattern are also stored, an on-screen display (OSD) generator 180 for generating an OSD keypad corresponding to the touch pattern under control of the second system controller, and a display device 190 for displaying the generated OSD keypad. The OSD keypad displayed by the video device 102 corresponds directly to the predetermined shape of the touch pad 110 of the controller 101 and includes a visual indication of at least one function of the video device. An area of the OSD keypad may correspond to the at least one function and may be highlighted as an object of focus, and according to a key code determined by a user command (i.e., touch), the object may be shifted in correspondence to a touch trajectory. Accordingly, the controller 101 includes a touch pad of a predetermined shape and generates a key code according to a touch motion (trajectory) made by the user, and the video device 102 includes a display device for displaying an OSD keypad response to the key code generated by the controller, where the OSD keypad is displayed on the video device in correspondence to the predetermined pattern of the touch pad.

The video device 102 may be a digital television receiver having recording capabilities (PVR) including a time-shift function and may be provided with plural tuners for receiving both digital and analog broadcast signals and an external signal input port for receiving a video signal from a peripheral device such as a VCR or DVR. Such a digital television is typically provided with a user interface (not shown) for inputting user commands other than the touch trajectory. Such a user interface may include function controls similar to that of the key signal input unit 130 of the controller 101, and the key signal input unit may include keys for controlling, for example, a digital television receiver, to include at least one menu setup key.

Figure 2A:
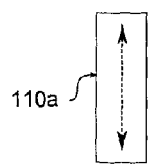
FIGS. 2A-2J are plan-view diagrams respectively illustrating a number of predetermined touch patterns for the touch pad of FIG. 1.
Figure 2B:
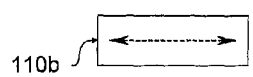
Figure 2C:
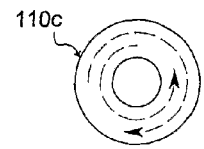
Figure 2D:
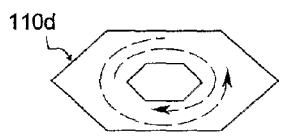
Figure 2E:
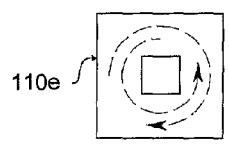
Figure 2F:
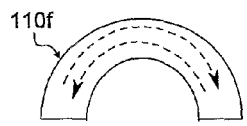
Figure 2G:
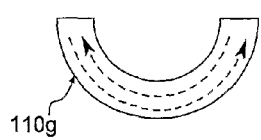

FIGS. 2A-2J illustrate predetermined touch patterns 110a-110j, respectively, which are suggested patterns for the touch pad of FIG. 1. For example, the touch patterns 110a and 110b each have a rectangular shape, which may be extended lengthwise to be oriented vertically as shown in FIG. 2A or oriented horizontally as shown in FIG. 2B. The touch patterns 110c, 110d, and 110e each have an essentially annular shape, which may be formed as a round touch pattern as shown in FIG. 2C, as a hexagonal touch pattern as shown in FIG. 2D, or as a square touch pattern as shown in FIG. 2E, and any of the annular touch patterns may be formed to foster a circular touch trajectory (as in FIG. 2C or 2E) or an elliptical touch trajectory (as in FIG. 2D). That is, though not specifically shown, the touch pattern 110c may have a more oval shape generally, the touch pattern 110d may have a more regular hexagon shape generally, and the touch pattern 110e may have a more rectangular shape generally, and the hollows formed by the above annular touch patterns may have a size (area) varying according to shape. The touch patterns 110f and 110g each have a crescent (semicircular) shape, which may be curved above a hollow (downwardly curved) as shown in FIG. 2F or curved below a hollow (upwardly curved) as shown in FIG. 2G. The general shape of the touch pad 110 may correspond to the shape of the touch pattern.

Figure 2H:
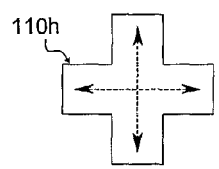
Figure 2I:
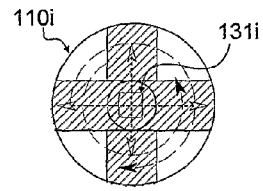
Figure 2J:
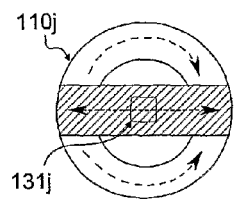

Furthermore, combinations of patterns may be variously configured, as exemplified by the touch patterns 110h-110j. For example, the rectangular touch patterns 110a and 110b may be combined to form a cross-type touch pattern 110h as shown in FIG. 2H, and the cross-type touch pattern may be combined with an annular touch pattern (e.g., touch pattern 110c) to form a hybrid touch pattern 110i as shown in FIG. 2I. A simplified hybrid pattern 110j may be formed as shown in FIG. 2J by combining the annular touch pattern 110c with one of the rectangular touch patterns 110a and 110b crossing the center of the annular pattern. The hybrid touch patterns 110*i* and 110*j* may be constructed as two superposed layers.

In addition, a selection button may be arranged in the hollow of a touch pattern and may correspond to a conventional tactile switch of a keypad. For example, the hollow of the touch pattern 110*i* or 110*j* may be provided with a selection button 131*i* or 131*j* in the form of a tactile switch. In the present invention, the selection button of a two-layer hybrid touch pattern is included in the key signal input unit 130 and may be disposed beneath a cross-type touch pattern (FIG. 2I) or rectangular touch pattern (FIG. 2J) placed over an annular circular pattern. In this case, inclusion of a selection button enables a selection of one pattern (element) of a hybrid touch pattern, for example, the cross-type touch pattern or annular touch pattern of FIG. 2I or the rectangular touch pattern or annular touch pattern of FIG. 2J. Yet, in the present invention, the first system controller 140 is configured with the coordinate recognition unit 120 according to the stored coordinate values of the memory 160, such that characteristics of the touch trajectory can be automatically determined by the intrinsic nature (basic type) of a touch motion performed by the user, without pressing the selection button.

FIGS. 3A-3E provide further examples of a touch pattern configuration for use with the touch pad 110 of the present invention, in which a plurality of tactile switches are arranged beneath an upper-layer touch pattern. In this case, an annular touch pattern is shown, but a predetermined touch pattern of another shape or combination may be employed, including rectangular and crescent shaped configurations. A tactile switch is provided for each of a corresponding plurality of areas of focus on the touch pattern.

Figure 3A:
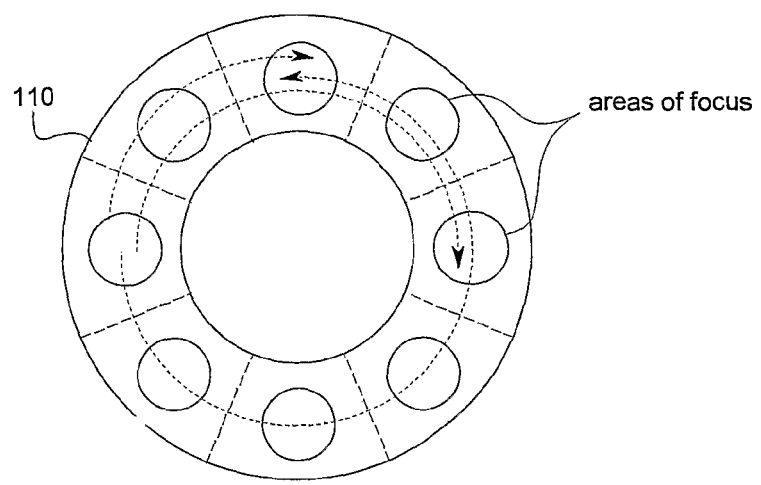
FIGS. 3A-3E are plan-view diagrams of further examples of a touch pattern configuration for use with the touch pad of the present invention.

Referring to FIG. 3A, eight separate areas of focus are established with respect to the predetermined touch pattern, enabling a touch trajectory performed by a user to pass through any or all areas of focus and, importantly, to travel in either direction, namely, first and second directions, which may correspond to a left/right motion, an up/down motion, or a clockwise/counterclockwise motion. The direction, distance and speed of the touch trajectory determines the shifting of an object (highlight) within an OSD keypad. In other words, after activating a desired menu, an object can be shifted by a single touch motion to a specific position corresponding to one of eight menu items on an OSD keypad. Moreover, using a hybrid touch pattern such as the touch pattern 110*j*, a horizontal touch trajectory may effect one type of object shifting, say, a left/right skip function on the OSD keypad, and a circular touch trajectory may effect another type of object shifting. In doing so, an object may be shifted in any of a set of fundamental directions, including for example up, down, left, and right, within a displayed OSD keypad.

Figure 3B:
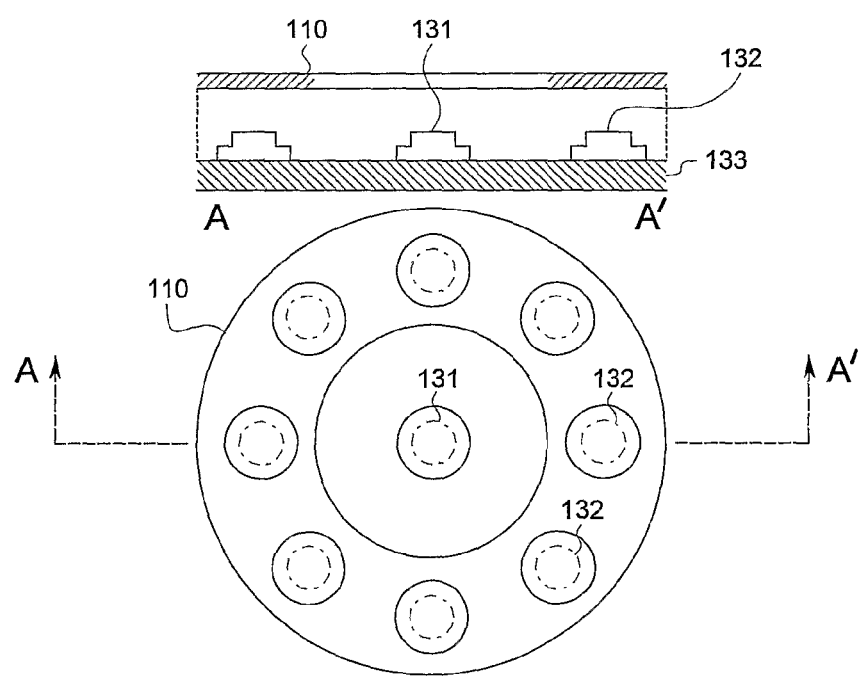

Referring to FIG. 3B, a plurality of key input buttons 132 may be provided on a substrate 133 of the key signal input unit 130 in correspondence to the areas of focus of FIG. 3A. Here, the selection button 131 may be used as a confirmation key, for example, to confirm execution of the function of a selected item or to determine whether the touch pad 110 or the key input buttons 132 are in use to shift and select items of the OSD keypad and its associated OSD display. A specific function may be assigned to each button by the first system controller 140 according to the display of an OSD keypad. This hybrid configuration of touch pad and key input buttons is particularly useful for a user who may be uncomfortable or unaccustomed to shifting and selecting OSD objects using only the touch pad, since the buttons 131 and 132 may be configured so that the OSD objects may also be manipulated conventionally, i.e., using the buttons only. In other words, the present invention provides for a parallel operation of the controller 101 to shift an object of the OSD keypad using either one of the touch pad 110 and the key input buttons 132.

Figure 3C:
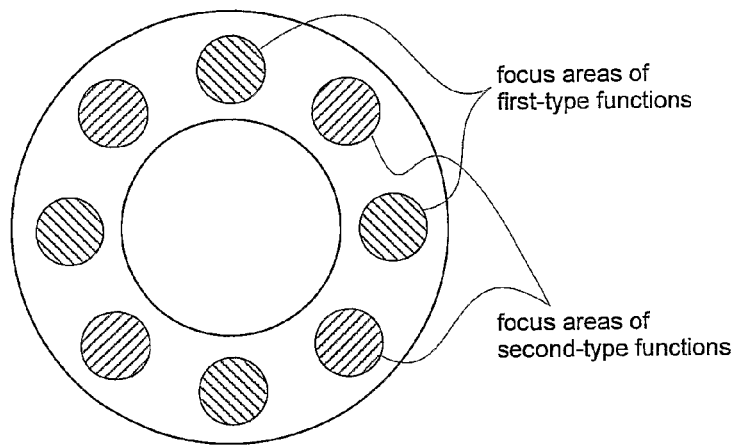
Figure 3D:
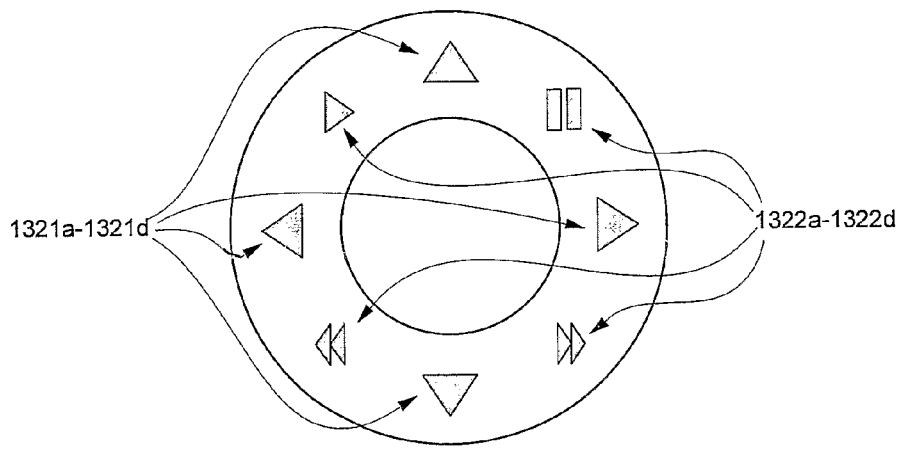

Referring to FIG. 3C, a further example of a hybrid configuration of touch pad and key input buttons for use with the touch pad 110 of the present invention includes assigning two types of functions to the plurality of key input buttons 132. As shown in FIG. 3D, the focus areas of the first type may correspond to standard arrows keys, namely, up, down, left, and right, respectively, and the focus areas of the second type may correspond to such time-shifting functions as play (i.e., normal play), pause (or stop), rewind (or reverse play), and fast-forward (or fast play), respectively. Accordingly, the plurality of key input buttons 132 may include first and second sets of function keys. The first-function keys respectively corresponds to a first set of focus areas of the predetermined pattern of the touch pad 110, and the second-function keys respectively correspond to a second set of focus areas of the predetermined pattern of the touch pad. Here, it should be appreciated that there may be any number of key input buttons in each set and any arrangement of the key input buttons within the predetermined pattern. For example, the first-function keys may include a plurality of direction keys 1321*a*-1321*d* for moving an object of a device under control of the controller, and the second-function keys may include a plurality of function keys 1322*a*-1322*d* for controlling functions of the device under control, where the plurality of direction keys includes at least one a play key, a pause key, a rewind key, and a fast-forward key and where the plurality of direction keys includes at least one time-shifting function key. A confirmation key (not shown) such as the selection button 131 may also be provided.

Figure 4:
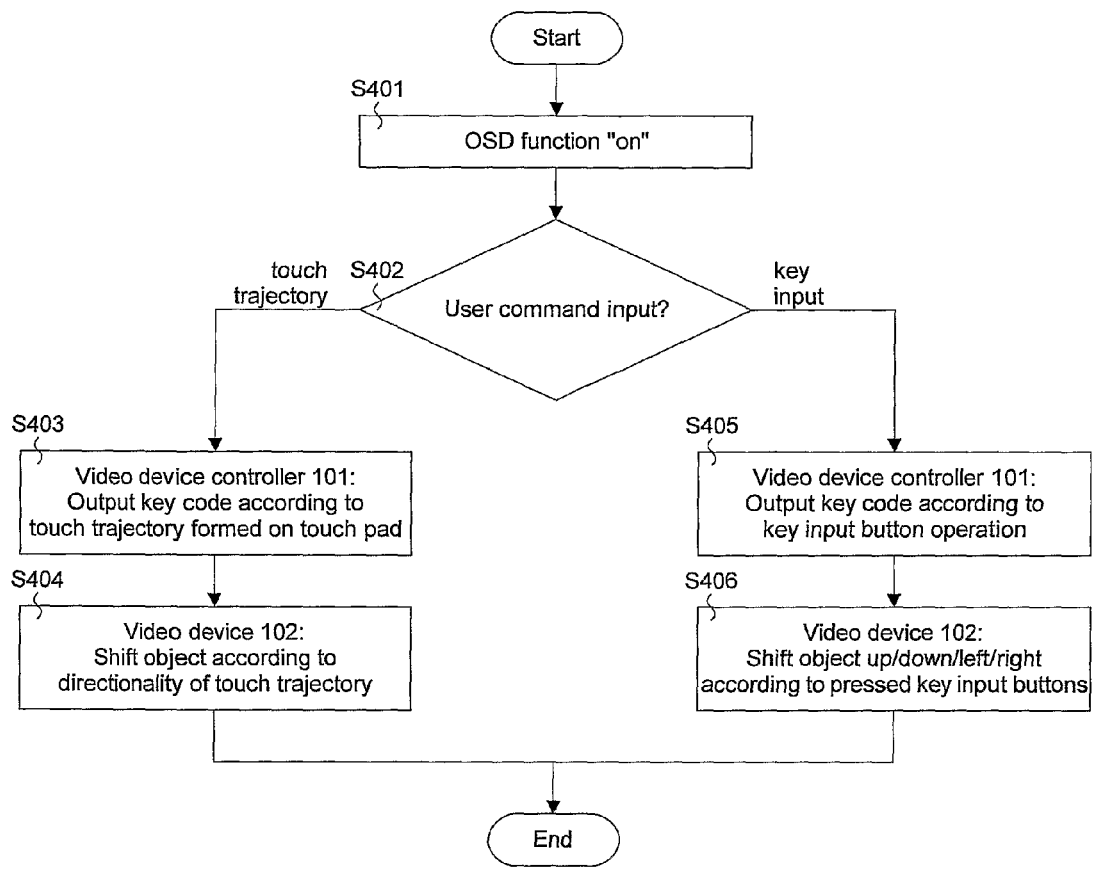
FIG. 4 is a flowchart illustrating a parallel operation of the controller using a hybrid configuration of touch pad and key input buttons according to the present invention.

A parallel operation of the controller 101 to shift an object of the OSD keypad in a specific direction with respect to a displayed OSD keypad or OSD image is shown in FIG. 4, in which the parallel operation responds to either one of the touch pad 110 and the key input buttons 132. Here, it should be appreciated that the key signal input unit 130 of the controller 101, such as a television remote controller (i.e., a video device controller), is typically provided with at least one hot key, provided as a convenient menu key, which remains operable or active unless a precluding condition exists, as in the case of another menu key (e.g., a home menu key) or other OSD display function (e.g., a broadcast guide) is currently in process. Accordingly, in response to a pressing of a menu key to initiate an OSD function, i.e., the OSD function is "on," a corresponding command signal is transmitted to the video device 102 to display an OSD keypad according to the pressed menu key (S401). In this state, a user command may be input to the controller 101 (S402). That is, the user may manipulate the controller 101 including at least one of the touch pad 110 and the key signal input unit 130, to generate a corresponding command signal, i.e., a key code, which is transmitted to the video device 102. In doing so, the first system controller 140 determines whether the input user command corresponds to a touch trajectory, i.e., an operation of the touch pad 110, or corresponds to a key input, i.e., an operation of one of the key input buttons 132. For a user command input of a touch trajectory, a key code corresponding to the touch trajectory and indicating its directionality, namely, a first or second direction (e.g., clockwise or counterclockwise), is generated and output from the controller 101 to the video device 102, which shifts the object accordingly (S403, S404). For a user command input of a key input of one of the key input buttons 132, a key code corresponding to the button operation is generated and output from the controller 101 to the video device 102, which shifts the object accordingly, for example, up, down, left, or right (S405, S406). In other words, the movement command signal output from the first system controller 140 includes a first command signal corresponding to the calculated values and a second command signal corresponding to the selected key input button.

Figure 3E:
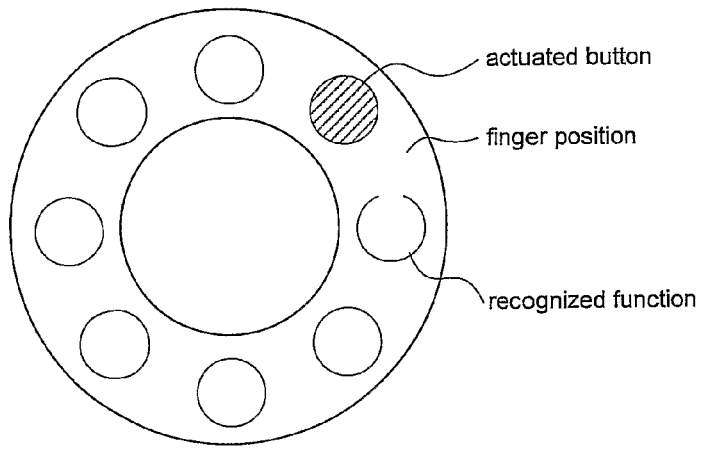

Referring to FIG. 3E, the first system controller 140 may determine an intended selection of one of the key input buttons 132 in the absence of a correspondence between the actuated button and the terminating position of a finger tracing a trajectory. For example, if the actually pressed key input button does not match the finger position, the first system controller 140 may determine that the button has been actuated due to unintended pressure and may thus generate a key code with reference to the finger position. In doing so, the first system controller 140 may determine the terminating position of a touch trajectory based on final recognized coordinates resulting from a (momentary) lifting or stopping of the user's finger, to recognize the corresponding function accordingly, for example, by determining the relative proximity of the terminating position with respect to the two adjacent focus areas. Thus, in response to a key signal generation according to an actuated key input button, the controller 101 preferentially generates a corresponding key code based on finger position information and then transmits the generated key code to the video device 102.

Therefore, according to a method of the present invention, a finger position is determined with respect to the touch pad in response to an actuation via the touch pad of one of the plurality of key input buttons. Then, if information of the finger position fails to match position information of the actuated key input button, the second command signal is preferentially generated according to the key input button corresponding to the finger position information.

Figure 5:
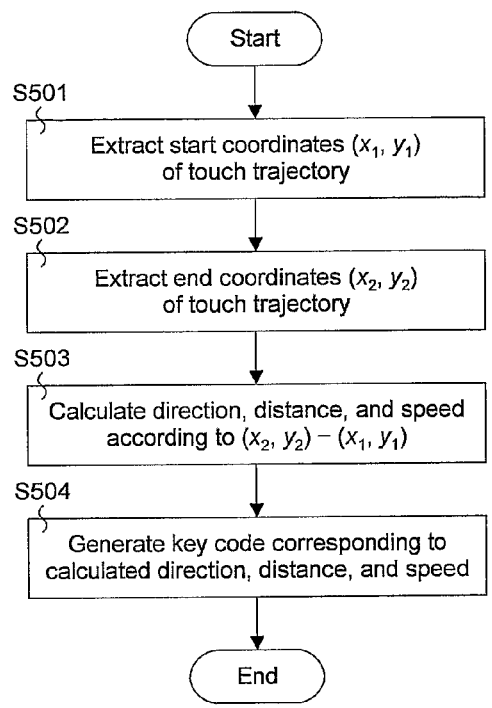
FIG. 5 is a flowchart illustrating a method of generating a key code and an object shift command signal in a coordinate recognition device according to a first embodiment of the present invention.

Referring to FIG. 5, illustrating a method of generating a key code in a coordinate recognition device according to a first embodiment of the present invention, a key code is generated according to the direction, distance, and speed of a touch trajectory executed with respect to of the touch pad 110 having a predetermined touch pattern, such as the touch patterns 110a-110j. In doing so, the controller 140 first extracts start coordinates $(x_1, y_1)$ and end coordinates $(x_2, y_2)$, in sequence, through the coordinate recognition unit 120 in response to the touch trajectory (S401, S402), and the extracted coordinates are recognized by the coordinate recognition unit 120. Then, based on the recognized coordinate values, the controller 140 calculates a direction, distance, and speed of the touch trajectory to output a corresponding movement command signal (S403). Here, the directionality of the touch trajectory may be determined according to a process illustrated in FIGS. 6A and 6B, each showing a touch trajectory expressed by coordinate values $(x_1, y_1)$ indicating the trajectory's start point and by coordinate values $(x_2, y_2)$ indicating the trajectory's end point, where the respective trajectories represent opposite directions.

Figure 6A:
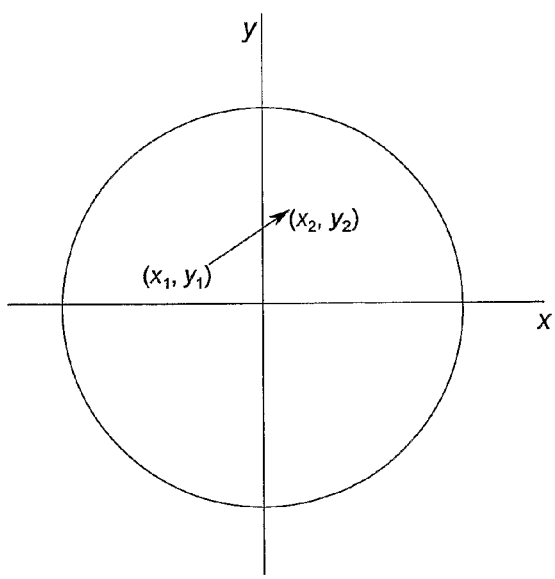
FIGS. 6A and 6B are diagrams for explaining the embodiment of FIG. 5.
Figure 6B:
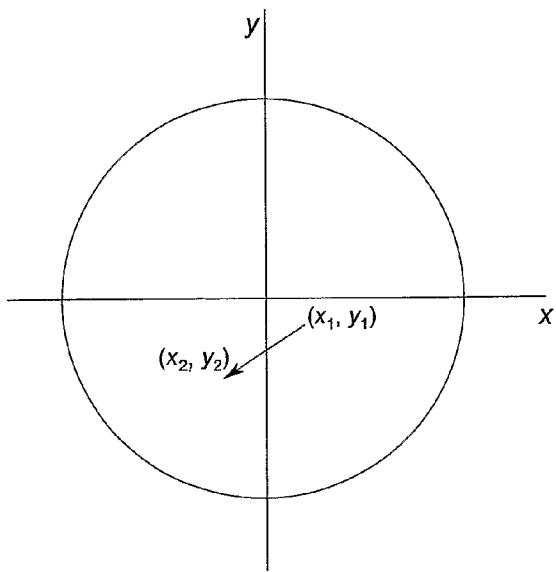

In the first embodiment, an increasing direction of a touch trajectory as shown in FIG. 6A or a decreasing direction of a touch trajectory as shown in FIG. 6B is determined by the stored system program, according to a movement command signal output by the controller 140 in correspondence with the recognized coordinates of each touch trajectory. Determination of touch trajectory direction by the controller 140 is facilitated by the touch pattern of the touch pad 110. Since the coordinate values corresponding to the predetermined touch pattern are previously stored in the memory 160 by the manufacturer—such that the distances and directions between the coordinate values are likewise stored or can be known—the controller 140 can determine the direction of any touch trajectory by a simple system program. Such a system program may compare a recognized touch trajectory's start and end coordinate values with each other and with zero, and based on the comparison results, determines a corresponding direction (i.e., increasing or decreasing) as shown in the example of Table 1.

TABLE 1

|  | $y_2 - y_1 > 0$ | $(y_2 = y_1) > 0$ | $y_2 - y_1 = 0$ | $y_2 - y_1 < 0$ |
|---|---|---|---|---|
| $x_2 - x_1 > 0$ | increasing | increasing | decreasing | decreasing |
| $(x_2 = x_1) > 0$ | decreasing | — | — | increasing |
| $(x_2 = x_1) < 0$ | increasing | — | — | decreasing |
| $x_2 - x_1 < 0$ | decreasing | decreasing | increasing | increasing |

As exemplified in Table 1, in accordance with the stored system program, when a touch motion is performed by the user with respect to the predetermined touch pattern of the touch pad 110 such that a touch trajectory is recognized by the coordinate recognition unit 120, one direction will be determined, for instance, as an increasing direction (i.e., a first direction) such that the substantially opposite direction will be determined as a decreasing direction (i.e., a second direction).

Meanwhile, the speed of a touch trajectory can be found by dividing the distance $(x_2, y_2)-(x_1, y_1)$ of the touch trajectory by a positive integer n, which is representative of a corresponding time of the touch trajectory. The distance of the touch trajectory be calculated using the same coordinate values, according to a variety of conventional techniques, for example, based on a determination of values for each of an x-coordinate movement distance $(x_2-x_1)$ and a y-coordinate movement distance $(y_2-y_1)$, and since the touch trajectory speed is determined based on the distance calculation, it can be said that a touch trajectory speed characteristic inherently includes a touch trajectory distance characteristic. On the other hand, once touch trajectory distance is found, the controller 140 may likewise determine the time of the touch trajectory by detecting the respective times of the start and end points of an executed touch trajectory and calculating a difference value or by using an internal clock or step counter to count the time of the touch trajectory generation. Then, using this time value and the known distance, the controller 140 can calculate the speed of the touch trajectory.

Provided with speed and direction values calculated as above, the key code generator 150 generates a key code corresponding to the touch trajectory's speed and direction (S404). An example of such key code generation, where three different touch trajectory speeds may be determined with respect to each of an increasing touch trajectory direction and a decreasing touch trajectory direction, is shown in Table 2.

TABLE 2

| direction | speed 1 | speed 2 | speed 3 |
|---|---|---|---|
| increasing | key code 1 | key code 2 | key code 3 |
| decreasing | key code 4 | key code 5 | key code 6 |

Figure 7:
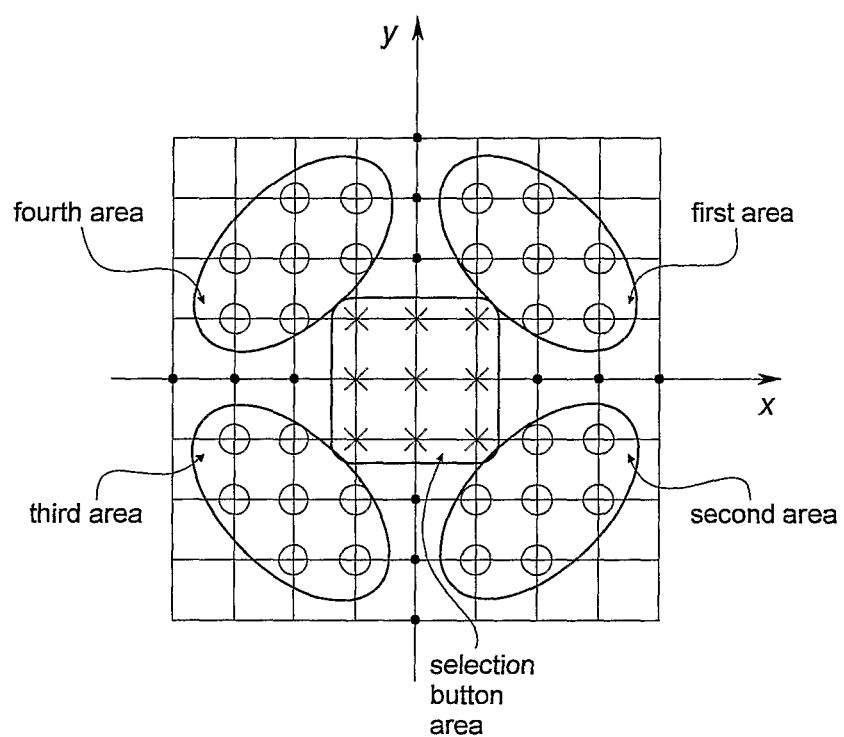
FIG. 7 is a diagram for explaining a method of generating a key code and an object shift command signal in a coordinate recognition device according to a second embodiment of the present invention.

FIG. 7 demonstrates a method of generating a key code in a coordinate recognition device according to a second embodiment of the present invention. As shown, a touch pattern includes a plurality touch pattern areas (focus areas), for example, first to fourth areas arranged within the touch pattern with respect to x and y axes. Here, information including one set of coordinate values corresponding to each of the arranged areas of the touch pattern are respectively stored in the memory 160 by the manufacturer, thereby enabling the controller 140 to determine touch trajectory direction, distance, and speed according to recognized coordinates of an executed touch trajectory. In particular, the stored information includes an indication of a distance between each of the plurality of touch pattern areas, which are preferably arranged such that adjacent areas are spaced equidistantly from one another.

In the example of FIG. 7, the plurality of touch pattern areas are arranged in correspondence to an annular touch pattern (e.g., touch pattern 110c), which includes a selection button area, but the second embodiment may utilize any touch pattern and the selection button area may be omitted. The recognized coordinates (shown as circled coordinates) correspond collectively to one touch pattern area, to be differentiated from other touch pattern areas, such that a touch trajectory that passes through one of at least two touch pattern areas can establish a direction, distance, and speed. Accordingly, if a touch trajectory passing through at least two touch pattern areas arranged along the path of an annular touch pattern is generated, one of first and second touch trajectory directions is determined by the controller 140, based on the system program stored in the memory 160 and the sequentially detected coordinate values output from the coordinate recognition unit 120 in accordance with the touch trajectory applied to the touch pad 110. These directions may correspond to clockwise and counterclockwise directions, i.e., opposite directions, and thus may be correlated to increasing and decreasing directions of the touch trajectory. A more accurate touch trajectory speed value may be determined by a touch trajectory that passes through three or more touch pattern areas, such as a touch trajectory generated clockwise from the fourth area to the third area, whereby the controller 140 and system program recognizes the direction as a first direction, say, an increasing direction. Conversely, a touch trajectory generated counterclockwise from the first area to the second area, whereby the controller 140 and system program recognizes the direction as a second direction, say, a decreasing direction (i.e., opposite to the first direction).

In this embodiment, touch trajectory distance can be found very simply based on a sum of the preset distances between adjacent touch pattern areas. Then, as in the first embodiment, the touch trajectory speed may be calculated using a touch trajectory time value. Subsequently, the key code generator 150 generates a key code corresponding to the calculated direction, distance, and speed values, for example, as in Table 2.

Figure 8A:
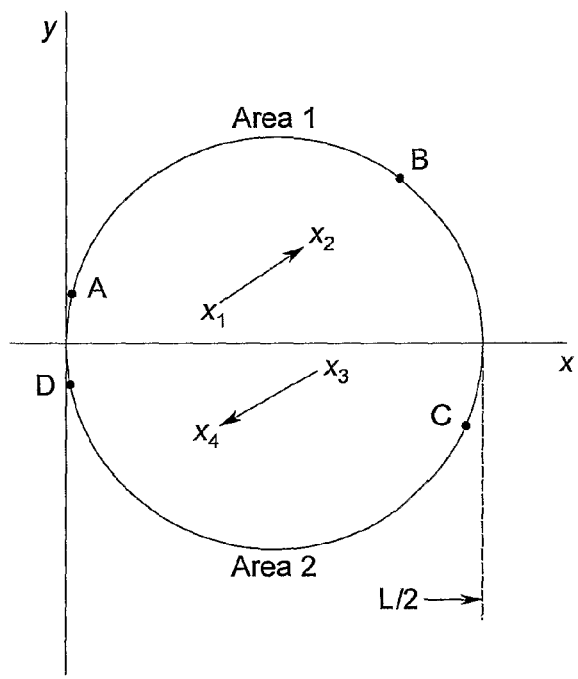
FIGS. 8A and 8B are diagrams for explaining a key code generation method according to a third embodiment of the present invention.
Figure 8B:
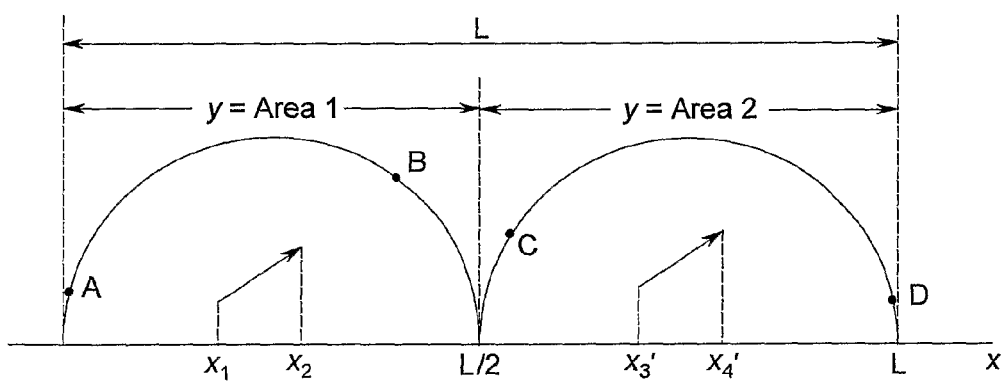

FIGS. 8A and 8B demonstrate a key code generation method according to a third embodiment of the present invention, which assumes an annular touch pattern inherently including two y-axis areas of the touch pattern, namely, an upper y-axis area (or "Area 1") and a lower y-axis area (or "Area 2"), which are delineated by the x axis. Here, points A-D are shown for reference purposes only. That is, the two y-axis areas of FIG. 8A are shown in FIG. 8B, in which the same areas are reconfigured for point-for-point symmetry between Areas 1 and 2, centering vertically on the maximum x-coordinate value (L/2), to thereby reposition the coordinates of the lower y-axis area. In other words, in FIG. 8A, Areas 1 and 2 correspond to the physical nature of the touch pattern, but in FIG. 8B, the lower y-axis area is repositioned such that Areas 1 and 2 both lie above the x axis theoretically and extend to twice the maximum x-coordinate value (L).

Therefore, due to the above correspondence between Areas 1 and 2, an x-axis coordinate x of Area 1 and the x-axis coordinate x' of Area 2 exhibit a relationship as expressed by Formula 1.

$$x' = \frac{L}{2} + \left(\frac{L}{2} - x\right) \quad \text{[Formula 1]}$$

where x' is the x-axis coordinate of the repositioned lower y-axis area, where x is the x-coordinate of the lower y-axis area without any reconfiguring of the touch pad area, and where L is twice the maximum x-coordinate value. Accordingly, the x-axis coordinate $x_3$ or $x_4$ of FIG. 8A is repositioned in FIG. 8B, to lie in the theoretically repositioned lower y-axis area, and can be represented as x-axis coordinate $x_3'$ or $x_4'$ per Formula 2.

$$x_3' = \frac{L}{2} + \left(\frac{L}{2} - x_3\right) \quad \text{[Formula 2]}$$

$$x_4' = \frac{L}{2} + \left(\frac{L}{2} - x_4\right)$$

Subsequently, the controller 140 uses the system program to determine values for the touch trajectory's direction, distance, and speed, which are calculated based on the repositioned x-axis coordinates, namely, the x' values of Formula 2 (per Formula 1). Here, the direction of a touch trajectory may be determined using Formulae 3 and 4.

$$(x_2 - x_1), (x_4' - x_3') > 0 \quad \text{[Formula 3]}$$

$$(x_2 - x_1), (x_4' - x_3') < 0 \quad \text{[Formula 4]}$$

That is, as shown in FIG. 8B, the values $x_1$ and $x_2$ of an Area 1 touch trajectory or the values $x_3'$ and $x_4'$ of an Area 2 touch trajectory are applied to each of Formulae 3 and 4. An increasing touch trajectory direction is determined when Formula 3 is true, and a decreasing touch trajectory direction is determined when Formula 4 is true. In other words, for either of the upper and lower y-axis areas, the direction of the touch trajectory is determined as an increasing direction (i.e., a first direction) if a difference between an x-axis value of start and end coordinates of the touch trajectory is greater than zero, and the direction of the touch trajectory is determined as a decreasing direction (i.e., a second direction) if a difference between an x-axis value of start and end coordinates of the touch trajectory is less than zero.

After determining the touch trajectory direction as above, a corresponding touch trajectory speed is calculated. The controller 140 may determine the speed of a touch trajectory based on its distance, by dividing the absolute value of the difference between the x coordinates by n, i.e., a positive integer corresponding to the touch trajectory time, as in $$\frac{|x_2 - x_1|}{n}$$

for Area 1 trajectories or $$\frac{|x_4' - x_3'|}{n}$$

for Area 2 trajectories. By thus calculating touch trajectory direction, distance, and speed, the key code generator 150 generates a key code corresponding to the calculated direction, distance, and speed values, for example, as in Table 2.

Figure 9:
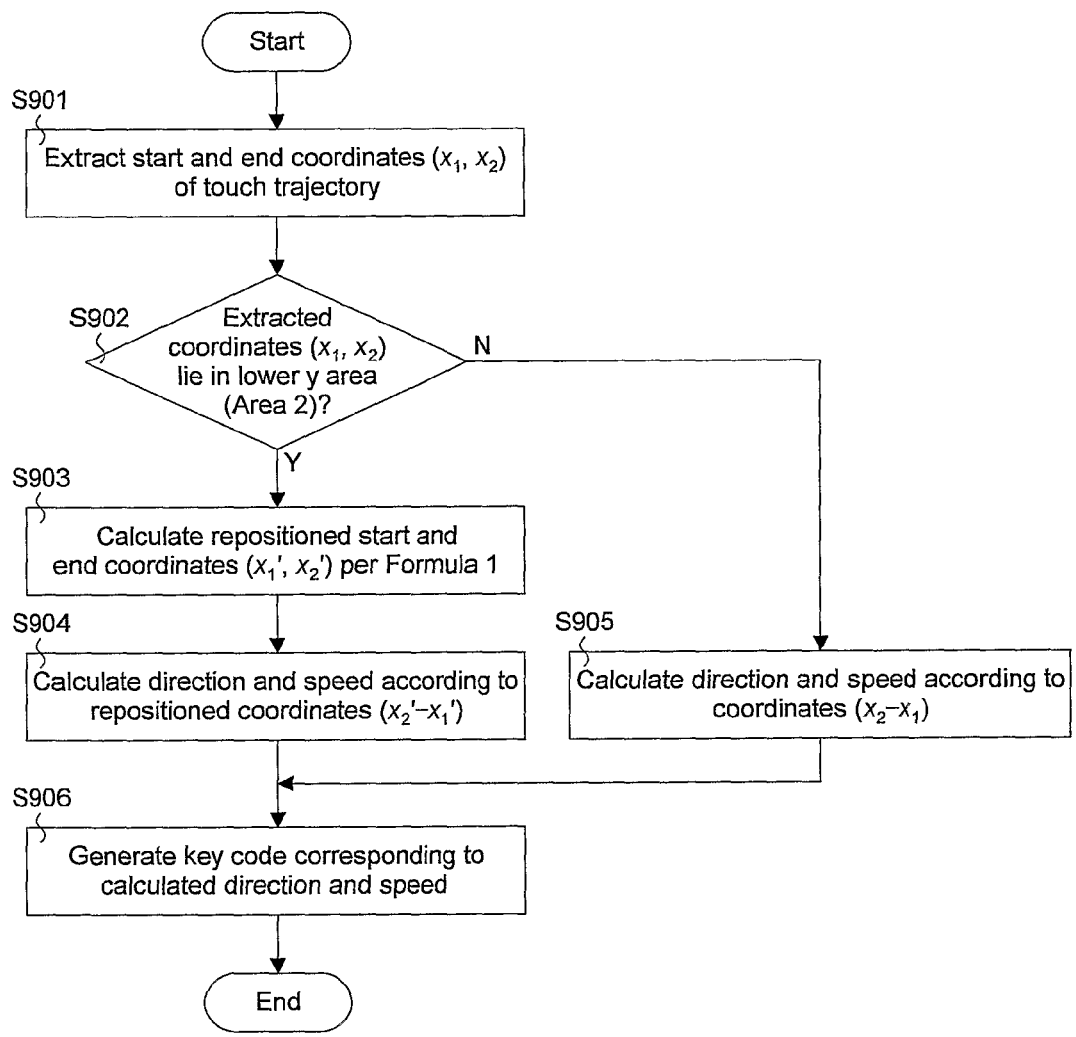
FIG. 9 is a flowchart illustrating a method of generating a key code and an object shift command signal in a coordinate recognition device according to the third embodiment of the present invention.

Referring to FIG. 9, illustrating a method of generating a key code in a coordinate recognition device according to the third embodiment, a key code is generated according to the direction, distance, and speed of a touch trajectory executed with respect to of the touch pad 110 having a predetermined touch pattern, such as the touch patterns 110a-110j. First, the controller 140 sequentially extracts start and coordinates through the coordinate recognition unit 120 in response to the touch trajectory. In doing so, the controller 140 first extracts the start and end coordinates ($x_1$, $x_2$), and the extracted values are stored in the memory 160 (S901). The controller 140 then determines whether or not the coordinates lie in Area 2 (S902), and if so, uses Formula 1 to find a repositioned start coordinate $x_1'$ and a repositioned end coordinate $x_2'$ (S903).

Thus, if the coordinates $x_1$ and $x_2$ lie in Area 2, the controller 140 calculates a direction and speed of the touch trajectory according to the repositioned coordinates ($x_2'-x_1'$), defining a touch trajectory distance in Area 2 (S904). On the other hand, if the coordinates $x_1$ and $x_2$ lie in Area 2, the controller 140 calculates a direction and speed of the touch trajectory according to the original coordinates ($x_2-x_1$), defining a touch trajectory distance in Area 1 (S905). That is, if both x coordinates lie in Area 2, i.e., in the lower y-axis area, the repositioned coordinate values are used for calculating touch trajectory direction and speed; if both x coordinates lie in Area 1, i.e., in the upper y-axis area, the stored (original) coordinate values are used for calculating touch trajectory direction and speed.

As in the first and second embodiments, the key code generator 150 generates, a key code corresponding to the touch trajectory's speed and direction based on the values calculated as above (S906). That is, according to the third embodiment, an annular touch pattern is divided into an upper area (Area 1) and a lower area (Area 2) of an x-y axis assignment with respect to the touch pad, and the two areas are configured for point-for-point symmetry between the upper and lower y-axis areas, centering vertically on a maximum x-coordinate point of the original touch pattern area, to thereby reposition coordinates of the lower y-axis area, so that the direction and speed of the touch trajectory may be determined using repositioned x coordinates.

An exemplary operation of the present invention will be described with reference to FIGS. 10A-10E and 11, in which functions of a video device are selected and set using a controller including a touch pad having a predetermined pattern. Though a touch pad of the example of FIGS. 3A and 3B is shown, it should be appreciated that the predetermined touch pattern of another shape or combination may be employed, including rectangular and crescent shaped configurations and that any number and arrangement of key input buttons 132 may be employed.

First, a selection (pressing) of a menu function key on the key signal input unit 130 of the controller 101, such as a hot key for a setup menu, is made by the user, and a corresponding command signal is transmitted to the video device 102 (S1101). In response to this signal, the second system controller 170 of the video device 102 displays an OSD keypad having the configuration (pattern) of the touch pad 110 (S1102).

Figure 10A:
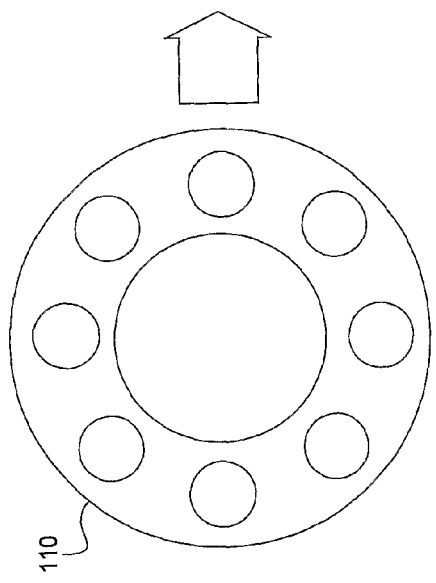
FIGS. 10A-10E are diagrams illustrating the sequence of an operation to select and set functions of a video device using a controller according to the present invention.
Figure 10B:
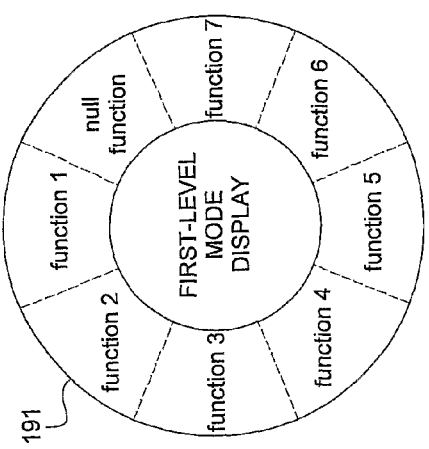

As shown in FIG. 10A, a displayed OSD keypad 191 includes a plurality of focus areas, each labeled per the function assigned to the corresponding key input button 132, for example, as a complement of functions 1 to 7 and a null function area. A help display corresponding to the current mode may be included in the OSD keypad 191 to represent a first-level mode display such as a setup mode of a television receiver, which may include functions such as XD video, memory card eject, picture size, multiplexed sound, channel memory, sleep mode, and auto channel programming.

Subsequently, with reference to the currently displayed OSD keypad 191, the user touches the touch pad 110 at a location corresponding to the position of a specific function, say, function 3, among the functions included in the OSD keypad (S1103). In doing so, the object of the OSD display is shifted (highlighted) to the corresponding focus area on the OSD keypad 191 (S1104).

Figure 10C:
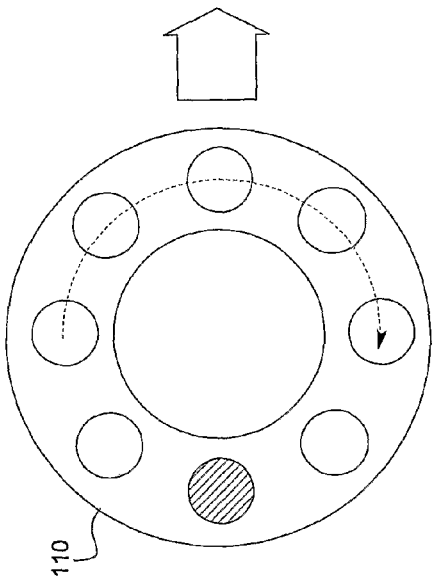
Figure 10D:
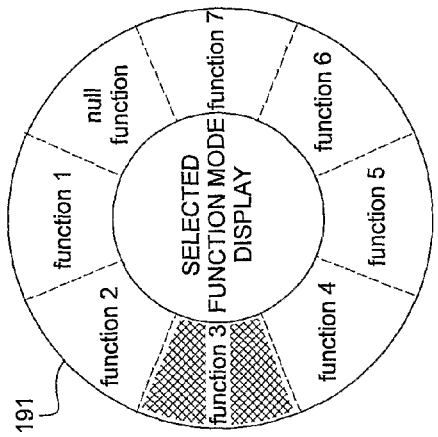

As shown in FIG. 10C, the selected function is highlighted. At this time, the help display may indicate the current status. For example, if a picture size function were selected as function 3, the help display may indicate "auto picture ratio" as a default setting of the picture size.

Figure 10E:
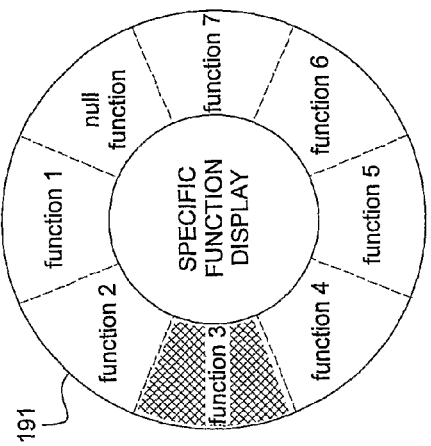
Figure 11:
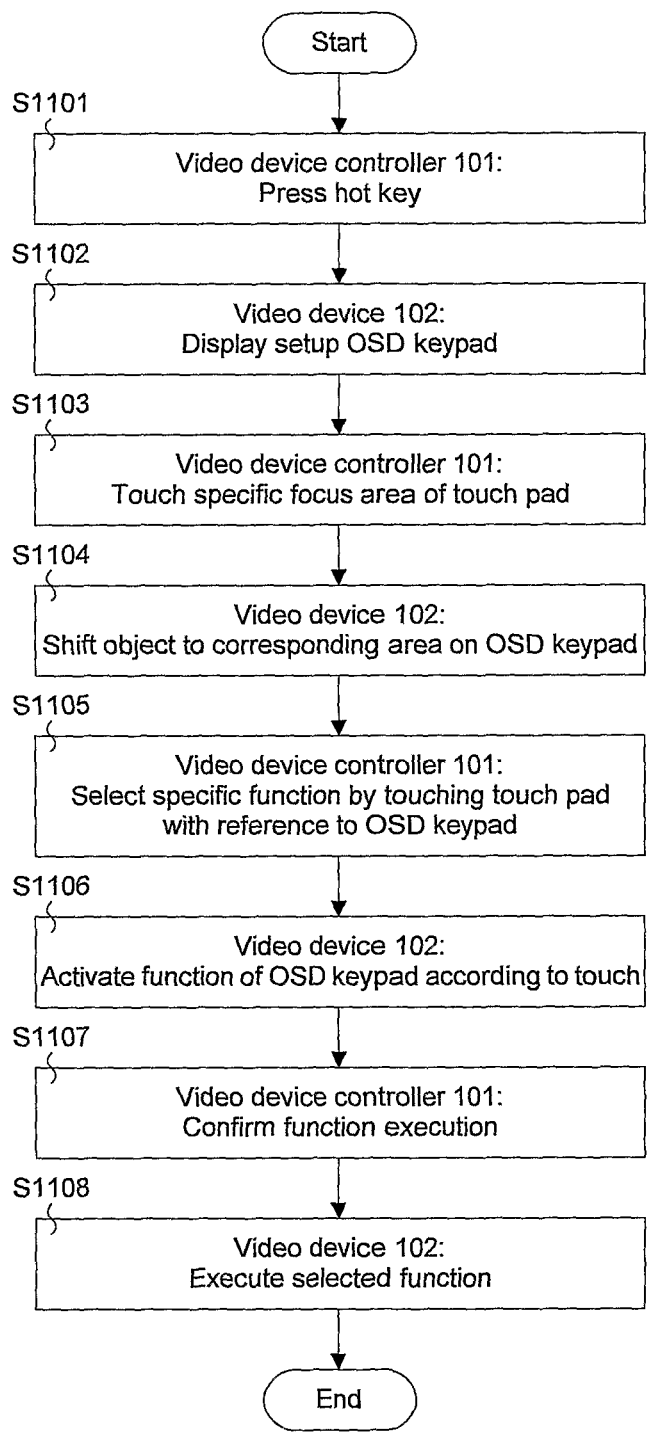
FIG. 11 is a flowchart illustrating the process diagramed in FIGS. 10A-10E.

Subsequently, with reference to the currently displayed OSD keypad 191, the user touches the touch pad 110 using a touch trajectory, such as a clockwise or counterclockwise motion, to select a specific function setting (S1105). This action is especially useful for adjusting functions exhibiting continuity, such as a channel selection, volume adjustment, or a time-shifting function of a television receiver or other video device. Alternatively, the user may simply click through a predetermined series of function settings conventionally, beginning from a default value. In doing so, the object of the OSD display is again shifted to the corresponding focus area on the OSD keypad 191, indicating the specific setting, say, a screen ratio of 4:3 or 16:9, and the video device 102 activates the selected function, so that the help display may indicate the specific function setting, as shown in FIG. 10E (S1106).

Upon completing the above function selecting and setting process, the selection (function confirmation) key 131 may be pressed to execute the selected function (S1107, S1108). Alternatively, confirmation may be made by a separate touch pad manipulation recognizable by the first system controller 140.

Accordingly, while an OSD function of the video device 102 is turned on, one of the touch pad 110 and the plurality of key input buttons 132, namely, one of the function (direction) keys 1321a-1321d, may be used as a set of direction keys for shifting an object in a specific direction and a specific distance within an OSD image of the video device. On the other hand, with the OSD function turned off, operation of one of the touch pad 110 and the plurality of key input buttons may be recognized for a channel adjustment or volume adjustment of the video device.

Figure 12A:
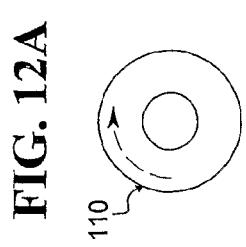
FIGS. 12A-12C are diagrams illustrating another exemplary operation of the present invention, in which a time-shift function is controlled using a controller according to the present invention.
Figure 12B:
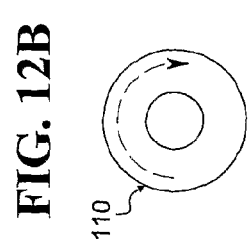
Figure 12C:
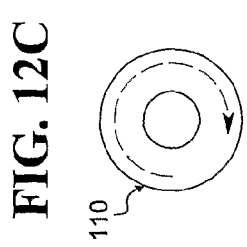

FIGS. 12A-12C illustrate another exemplary operation of the present invention, in which a playback speed of a time-shift function may be adjusted using a controller including a touch pad having a predetermined pattern. Here, a function selection process such as that performed as in FIGS. 10A-10E may be first executed.

FIG. 12A shows a first touch trajectory resulting in a recorded program being reproduced at, say, 2x-speed; FIG. 12B shows a second touch trajectory resulting in a recorded program being reproduced at, say, 8x-speed; and FIG. 12C shows a third touch trajectory resulting in a recorded program being reproduced at, say, 100x-speed. In each instance, after activating a hot key, the touch pad 110 is manipulated with reference to an OSD display providing a visual feedback to the user. For example, a one-quarter tracing of the touch pattern may produce a speed indication of two arrows on a progress bar, as shown in FIG. 12A; a two-quarters tracing of the touch pattern may produce a speed indication of four arrows on the progress bar, as shown in FIG. 12B; and a three-quarters tracing of the touch pattern may produce a speed indication of six arrows on the progress bar as shown in FIG. 12C. Similarly, according to another function selection process, the executed touch trajectory may shift a current playback indicator along a cache bar.

Figures 13A, 13B:
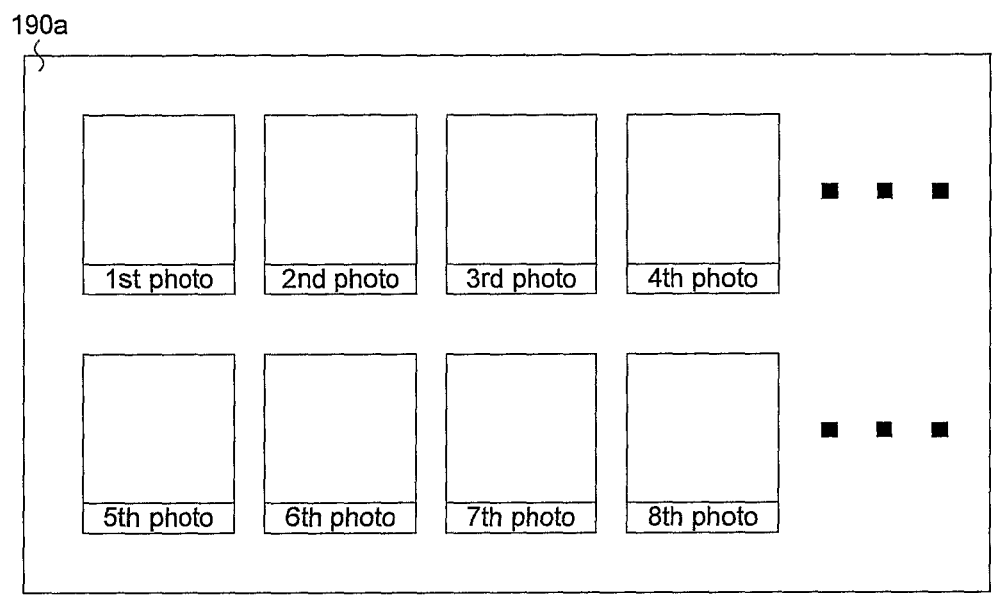
FIGS. 13A and 13B are diagrams illustrating another exemplary operation of the present invention, in which the orientation of a shifting direction of an object of an OSD menu is determined with respect to the directionality of a touch trajectory formed on a touch pad.

FIGS. 13A and 13B illustrate another exemplary operation of the present invention, in which a preferred orientation of a shifting direction of an object of an OSD menu may be determined based on the current makeup of the OSD menu. That is, using a touch pad of a predetermined pattern, such as an annular touch pattern or another shape or combination, including rectangular and crescent shaped configurations, a touch trajectory formed on the touch pad may be used to shift the object vertically (up and down) or horizontally (left and right) with respect to the OSD display, so that operation of the touch pad 110 for inputting a touch trajectory substantially serves as a predetermined arrow key. The example of FIG. 13A includes an OSD menu displayed on a screen 190*a* of the display device 190 where the number of items in the OSD menu exhibits a greater frequency horizontally than vertically, i.e., a predominantly horizontal arrangement of menu items, while the example of FIG. 13B includes an OSD menu display where the number of items in the OSD menu exhibits a greater frequency vertically than horizontally, i.e., a predominantly vertical arrangement of menu items.

Figure 14:
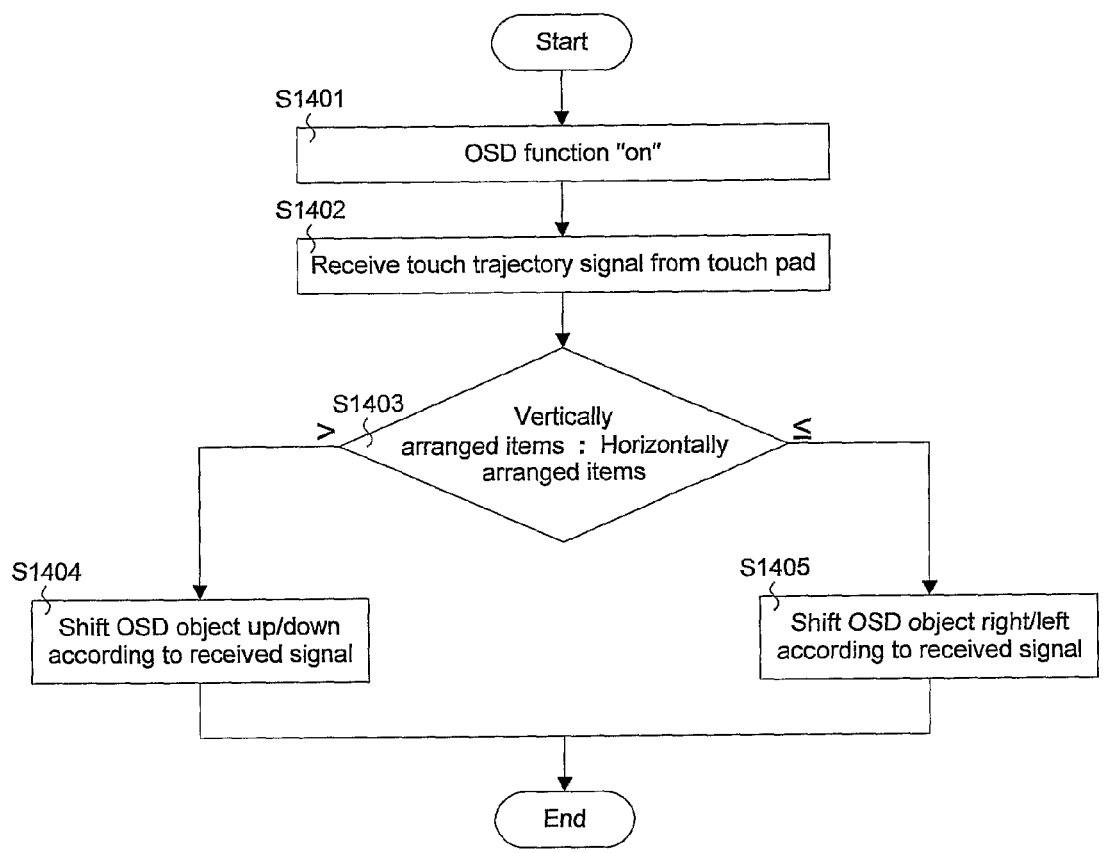
FIG. 14 is a flowchart illustrating a process relating to FIGS. 13A and 13B.

Referring to FIG. 14, illustrating a process relating to FIGS. 13A and 13B, a menu key to initiate an OSD function is pressed to turn on the OSD function (S1401). Thereafter, a corresponding command signal is transmitted to the video device 102 to display an OSD keypad according to the pressed menu key (S401). In this state, a touch trajectory may be executed with respect to the touch pad 110, whereby a touch trajectory signal is generated and received at the first system controller 140 of the controller 101 (S1202). A corresponding command signal, i.e., a key code, is transmitted to the video device 102, which first considers the state of the OSD menu being displayed. Namely, the second system controller 170 determines whether the currently displayed OSD menu contains more vertically arranged items than horizontally arranged items or whether the currently displayed OSD menu contains more horizontally arranged items than vertically arranged items (S1203). Then, the directionality of the executed touch trajectory is detected, and the OSD object is shifted accordingly (S1204, S1205). That is, it is determined whether the directionality corresponds to a first or second direction (e.g., clockwise or counterclockwise), whereby detection of a first-direction trajectory may result in shifting an object in an OSD menu such as that of FIG. 13A to the left and whereby detection of a second-direction trajectory may shift the same object to the right. On the other hand, for an OSD menu such as that of FIG. 13B, the first and second directions may correspond to an upward or downward shifting of an object. An operation of the selection button 131 may be used in the event of an OSD menu including a combination of horizontal arrangements and vertical arrangements. In any case, the distance of the touch trajectory determines the distance of the shift, though a speed of the touch trajectory may not be a factor in such shifting.

INDUSTRIAL APPLICABILITY

By adopting the present invention, in manipulating on-screen display objects using a user interface (e.g., a remote controller provided with a touch pad) to control various functions and settings of a device under control (e.g., a video device such as a television receiver), and particularly functions exhibiting continuity over a range of control, object movement on the screen is performed quickly and easily using a simple program. The touch pad has a touch pattern imparted with a predetermined shape to enable recognition of a touch trajectory in a simple manner.

Accordingly, the present invention enables key codes for conveniently and accurately shifting an object displayed on an OSD menu to be selectively generated by a user performing a preferred or familiar method. That is, a hybrid configuration of touch pad and key input buttons for a dual-type (parallel) control of a device under controller, e.g., a video device such as a television receiver having an OSD function, is provided to enable a selective use of the touch pad or the key input buttons to control functions (e.g., channel or volume adjustment) and particularly to enable the shifting of an object in a specific direction within an OSD image of the video device. This hybrid configuration provides a compact controller by enabling the control of numerous functions while minimizing a surface area of the controller. In addition, the present invention enables output of an intended key code based on a finger position detected with respect to a touch pad, thereby preventing key code generation in the event that a key input button of the touch pad is inadvertently pressed.

While the present invention has been described and illustrated herein with reference to one or more preferred embodiments, it will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A display device comprising:
an on-screen display (OSD) generator that generates information indicative of a plurality of sections corresponding to a plurality of predetermined functions of the display device, wherein the sections are arranged in a predetermined pattern in an OSD;
a screen to display the sections in the predetermined pattern; and
a controller to control the screen to:
(a) display a first section in the predetermined pattern differently from one or more other sections in the predetermined pattern based on a first signal generated based on a touch input on a touch pad, and
(b) display information indicative of a change of a parameter corresponding to the first section based on a second signal generated based on a touch trajectory on the touch pad, wherein:
the information indicative of the parameter change is displayed in a continuous manner in accordance with the touch trajectory, and
the controller controls the screen to display additional information for indicating a current setting status of the first section before performing the predetermined function corresponding to the first section, and
the controller is further configured to:
(c) determine a first number of menu items displayed in a first direction,
(d) determine a second number of the menu items displayed in a second direction;
(e) compare the first number to the second number;
(f) shift one or more of the menu items in response to a movement command signal based on a result of the comparing; and
(g) when the number of menu items changes from a first state to a second state, change shifting of one or more of the menu items from one of the first direction or the second direction to the other one of the first direction or the second direction in a same screen, wherein the number of menu items in the first direction is greater than the number of menu items in the second direction in the first state, and the number of menu items in the first direction is less than the number of menu items in the second direction in the second state.

2. The display device of claim 1, further comprising a wireless receiver to receive the first key code and the second key code.

3. The display device of claim 1, wherein the controller displays the first section differently by highlighting the first section in the predetermined pattern.

4. The display device of claim 1, wherein said additional information includes information indicating a current status of the function corresponding to the first section.

5. The display device of claim 1, wherein the controller controls the screen to display the additional information within the OSD, and wherein the current setting status is stored as a default value in a memory.

6. The display device of claim 1, wherein the current setting status corresponds to a value set previously by a user.

* * * * *